United States Patent [19]

Haraldsson et al.

[11] 4,219,857
[45] Aug. 26, 1980

[54] PROTECTIVE METHOD AND CIRCUITS FOR SHEATHED ELECTRICAL RESISTANCE HEATING UNITS

[75] Inventors: Eythor M. Haraldsson, Easton, Mass.; LeRoy J. Herbst, Louisville, Ky.

[73] Assignee: General Electric Company, Louisville, Ky.

[21] Appl. No.: 863,501

[22] Filed: Dec. 22, 1977

[51] Int. Cl.² .................................................. H02H 3/16
[52] U.S. Cl. .................................... 361/42; 361/50; 361/104; 219/322; 219/509
[58] Field of Search .................. 361/42, 50, 104, 103, 361/105, 106, 47, 48, 49; 219/322, 509, 517, 363, 423, 481, 514, 519

[56] References Cited

U.S. PATENT DOCUMENTS

| | | | |
|---|---|---|---|
| 2,094,480 | 9/1937 | Vogel | 219/443 |
| 2,614,200 | 10/1952 | McNair | 361/42 X |
| 3,247,358 | 4/1966 | Schmidt | 219/509 X |
| 3,351,813 | 11/1967 | Trout | 361/104 X |
| 3,445,631 | 5/1969 | Fickweiler | 361/103 X |
| 3,592,771 | 7/1971 | Vedder | 252/63.2 |
| 3,628,093 | 12/1971 | Crowley | 361/103 |
| 3,868,552 | 2/1975 | Wickson | 361/104 |
| 3,936,702 | 2/1976 | Plasko | 361/104 |
| 4,044,224 | 8/1977 | Jenkins et al. | 361/42 X |
| 4,054,857 | 10/1977 | Bowling | 337/129 |

FOREIGN PATENT DOCUMENTS

1202333  8/1970  United Kingdom.

*Primary Examiner*—Patrick R. Salce
*Attorney, Agent, or Firm*—H. Neil Houser; Radford M. Reams

[57] ABSTRACT

In one embodiment, a sheathed electrical resistance heating unit is operated from a 120 volt unbalanced-to-ground household power line. The heating unit sheath is grounded. In order to interrupt a fault between the actual resistance heating element and the outer sheath of the heating unit, regardless of where along the length of the heating unit the fault occurs, a fuse is connected in series with the "hot" side of the power line, and, by means of at least one unidirectional current conducting device, the two terminals of the heating element are effectively connected, through the fuse, to the "hot" side of the power line during alternate AC half-cycles.

23 Claims, 8 Drawing Figures

PROTECTIVE METHOD AND CIRCUITS FOR SHEATHED ELECTRICAL RESISTANCE HEATING UNITS

BACKGROUND OF THE INVENTION

The present invention relates generally to protective methods and circuits for sheathed electrical resistance heating units. More particularly, the invention relates to a method and circuits for reliably interrupting a fault in the form of an arcing short which may occur between the heating element and the grounded conductive outer sheath of such a heating unit, regardless of where along the length of the heating unit the fault occurs. The protective methods and circuits of the invention are particularly beneficial when operated from a 120 volt unbalanced power line. The invention may be employed in household appliances, particularly dishwashers.

Sheathed electrical resistance heating units have been employed for many years in various products, for example electric ranges and dishwashers. Such heating units generally comprise a heating element in the form of a spiralled electric resistance wire encased in an elongated ceramic-filled metal outer sheath, which is electrically conductive. The ceramic material transmits heat, but is an electrical insulator. Thus, the outer sheath becomes hot, but normally remains electrically insulated from the heating element. A suitable ceramic material is magnesium oxide. Sheathed electrical resistance heating units of this general type are described in U.S. Pat. No. 2,094,480 to Vogel and U.S. Pat. No. 3,592,771 to Vedder et al, the disclosures of which are hereby incorporated by reference.

In the operation of such heating units, the terminals of the heating element are connected to a power source, for example a household AC power line. A 120 volt heating unit is normally connected between the "hot" side and neutral of a 120 volt unbalanced-to-ground line, in which case one terminal of the heating element is electrically "hot," and the other terminal is electrically "cold." A 240 volt heating unit is normally connected across both sides of a 240 volt balanced line, in which case both terminals of the heating element are "hot." Normally, for safety reasons, the outer conductive sheath is grounded.

One particular failure mode which is possible in such a heating unit is associated with a breakdown in the insulation qualities of the magnesium oxide separating the heating element from the outer sheath, accompanied by arcing between the element and the outer sheath. For reasons not fully understood, such a breakdown and arc may occur even near the "cold" end of the heating unit where, theoretically, there should be little potential difference between the heating element and the outer sheath. When such a fault occurs near the heating unit "cold" end, current drawn from the power line is not significantly increased because a substantial portion of the resistance heating element remains interposed in series with the "hot" side of the power line. Any circuit breaker or fuse device in series with the "hot" side of the power line is not immediately tripped or "blown," and the arc is thus not immediately extinguished.

In some cases, the arc generates sufficient heat to actually melt the outer sheath. Such disruption in the outer sheath travels lengthwise along the sheath, towards the "hot" end, until only a short length of heating element remains in the circuit. The resulting low resistance allows sufficient current to flow to cause the protective fuse or circuit breaker to interrupt the circuit. This phenomenon is commonly referred to as "zippering" because the disruption in the outer sheath resembles the opening of a zipper.

In the event a fault occurs near the "hot" end of the heating unit, the fuse or circuit breaker interrupts the circuit in fairly short order, and significant "zippering" does not occur.

One device to rapidly terminate "zippering" is disclosed in U.S. Pat. No. 4,044,224, issued to Jenkins and Herbst. The Jenkins and Herbst device replaces the direct electrical connection between the outer conductive sheath and ground with a fusible link. During normal operation of the heating unit when the insulation material is intact, substantially no current flows through the outer sheath ground connection (with the exception of a small amount of AC leakage current largely as a result of capacitive effects). However, when a fault occurs, significant current flows through the outer sheath ground connection, causing the fusible link to open. Additionally, in the Jenkins and Herbst arrangement, a switch is mechanically arranged to open when the fusible link is broken, and this switch cuts off power to the heating element. The particular application of the protective device described by Jenkins and Herbst is in a household dishwasher having a plastic tub. The present invention is an alternative to the device disclosed in the Jenkins and Herbst patent.

Accordingly, it is an object of the invention to rapidly terminate a fault between the heating element and the outer sheath of a sheathed electrical resistance heating unit when the fault occurs near either end of the heating unit.

It is another object of the invention to rapidly terminate a fault between the heating element and the outer sheath of a sheathed electrical resistance heating unit, regardless of where along the heating unit the fault occurs.

It is another object of the invention to provide low-cost circuitry for reliably and effectively extinguishing an arcing short within a sheathed electrical resistance heating unit regardless of where along the heating unit the arching short occurs.

It is still another object of the invention to provide such circuitry which is suitable for use with a sheathed electrical resistance heating unit which is operated alternately by connecting it directly across a power source for full-wave, full power operation, or by connecting the heating unit in a half-wave rectifying arrangement for partial power operation.

SUMMARY OF THE INVENTION

Briefly stated, and in accordance with one aspect of the invention, these and other objects are accomplished by a circuit which includes a means having two terminals for supplying AC power. One of the terminals of the AC power-supplying means supplies a voltage relative to a ground reference potential and thus is a "hot" terminal. The circuit further includes means sensitive to current flow from the "hot" AC power-supplying terminal for interrupting current flow from the AC power-supplying means when sensed current exceeds a predetermined value. A typical predetermined value is twice normal operating current.

In accordance with the invention, means are provided for alternately connecting each of the two terminals of the heating element to the "hot" terminal of the AC power-supplying means during alternate AC half-cycles. Thus, for a fault occurring near either end of the heating unit, significant current is drawn from the "hot" side of the AC power line during at least AC half-cycles of one polarity. This additional current is added to the normal heating current flowing through the current-sensitive means, and thus rapidly causes the current-sensitive means to interrupt the flow of AC power before significant "zippering" can occur.

Further, and of greater significance, for heating units operated from an unbalanced-to-ground power line, such as a conventional 120 volt AC household circuit, a fault occurring at any point along the heating unit is rapidly terminated. This holds true, when the invention is employed, for either half-wave, partial power operation or full-wave, full power operation. Additionally, for heating units operated from a balanced power line, such as a conventional 240 volt AC household circuit, protection is provided during half-wave, partial power operation regardless of the location of the fault along the heating unit.

In the method of the present invention, an arcing short within a sheathed electrical resistance heating element is extinguished by alternately connecting each of the two terminals of the heating element to the "hot" conductor of an AC power source during alternate AC half-cycles. The current supplied by the "hot" conductor is sensed, and the AC power source is disconnected from the heating element when the sensed current exceeds a predetermined value.

In one particular embodiment of the invention connected to a 120 volt unbalanced line, the heating element is operated with half-wave rectified power for partial power operation. In this embodiment, for normal operation of the heating unit, one terminal of the heating unit is connected through the current-sensitive circuit interrupting means to the "hot" side of the AC line, and the other terminal of the heating unit is connected through a unidirectional current conducting means, such as a semiconductor diode, to the neutral line conductor. The heating element is thus supplied with half-wave rectified power. To effectively connect the other terminal of the heating element to the "hot" side of the AC power line during those AC half-cycles when normal heating current does not flow, another unidirectional current conducting device is connected in parallel with the heating unit and oppositely poled with respect to the first-mentioned unidirectional current conducting device.

In another specific embodiment of the invention, the heating unit terminals are connected across the pulsating DC output conductors of a four-leg, full-wave bridge rectifier. It will be appreciated that during alternate AC half-cycles first one and then the other terminal of the heating element is connected to the "hot" side of the power line. When operated from an unbalanced power line, a fault occurring anywhere along the heating unit causes significant additional current to flow in the "hot" side of the power line.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENTS

Figure 1:
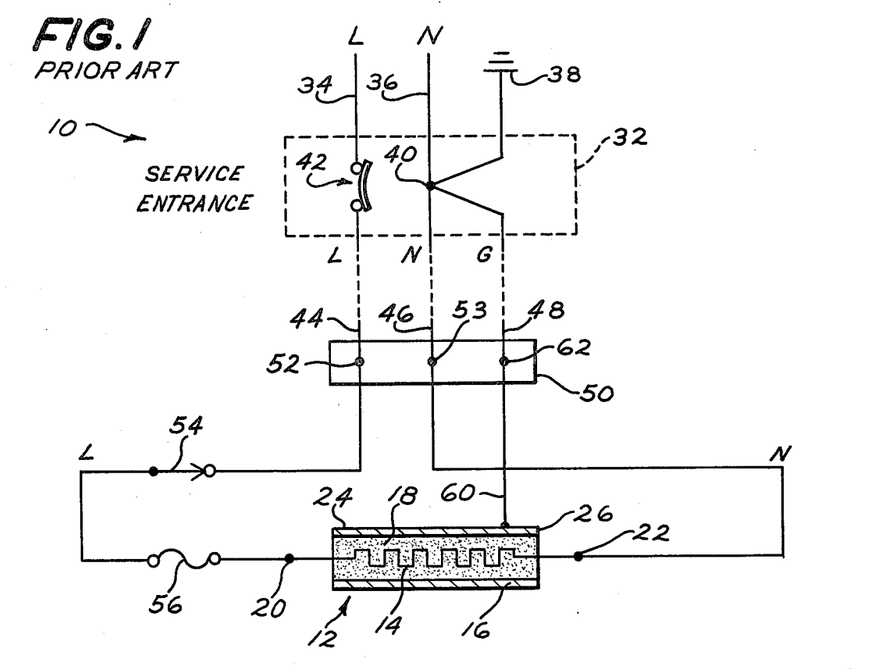
FIG. 1 is a schematic representation of a prior art circuit for operating a sheathed electrical resistance heating unit.
Figure 2:
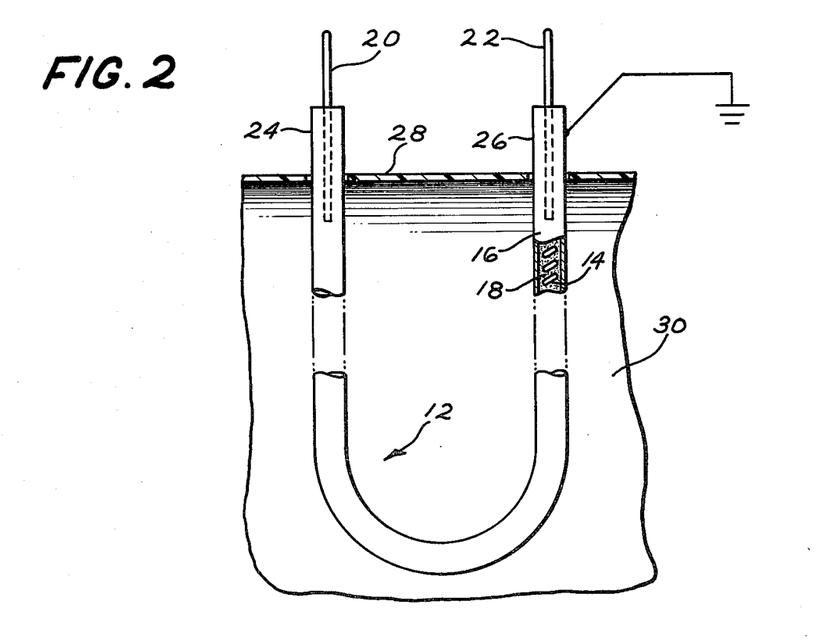
FIG. 2 shows the physical arrangement of a sheathed electrical resistance heating unit mounted within an automatic dishwasher.

Referring now to the drawings wherein identical reference numerals denote similar or corresponding elements throughout the various figures, FIG. 1 is a basic prior art operating circuit 10 for a sheathed electrical resistance heating unit 12, which operating circuit 10 the present invention improves. FIG. 2 shows the physical arrangement of the heating unit 12 as applied to a plastic tub dishwasher.

The sheathed electrical resistance heating unit 12, schematically represented in FIG. 1 and physically depicted in FIG. 2, comprises a spiralled electrical resistance heating element 14 encased in a conductive metallic sheath 16, which in turn is filled with ceramic insulation material 18. The heating element 14 has two power connection terminals 20 and 22, which may also be considered terminals of the heating unit 12 itself. In FIG. 2, the heating element terminals 20 and 22 may be seen to comprise electrical conductors extending a substantial distance into each of the ends 24 and 26 of the heating unit 12, thereby providing "cold" ends for the heating unit 12. In FIG. 2, the ends 24 and 26 of the heating unit 12 project through a plastic wall 28 of a dishwasher tub, the bottom portion of the dishwasher tub being designated 30.

Referring particularly to FIG. 1, an AC power source generally comprises a service entrance 32, which is commonly referred to as the "fuse box" or "circuit breaker box" in a home. The service entrance 32 is connected to "L" and "N" AC power lines 34 and 36, the line 36 being a neutral line. The "L" line 34 is "hot," and supplies a voltage relative to the "N" line 36. The "N" line is connected to ground reference potential at various points, including a typical ground connection 38, for example a cold water pipe connection. Within the service entrance 32, the "N" line 36 and the ground connection 38 are tied together at a grounding point 40. Finally, a protective circuit breaker 42 is interposed in series with the "L" power line 34.

The particular service entrance 32 illustrated may be considered as being a nominal 120 volt unbalanced serivce, with the "N" line 36 maintained at ground potential, and the "L" line 34 maintained at approximately 120 volts relative to the "N" line 36. It will be appreciated that the unbalanced service entrance 32 may comprise a portion of a 240 volt balanced service entrance.

The output of the service entrance 32 comprises AC power source conductors 44 and 46, which are "L" and "N" or "hot" and "cold" conductors, respectively. Typically, the "N" conductor 46 is identified by white insulation, and the "L" conductor 44 is identified by black or red insulation.

Additionally, for safety purposes, a ground (G) conductor 48 extends from the service entrance 32, and is connected to the grounding point 40. Typically the ground conductor 48 is identified either by green insulation, or is a bare conductor.

A means 50 within the appliance itself for supplying AC power to the circuitry in the appliance is shown in the form of a terminal strip. However, the AC power-supplying means 50 may take other forms, such as an ordinary AC power plug. One terminal 52 of the AC power-supplying means 50 is adapted for connection to one AC power source conductor 44, and another terminal strip terminal 53 is adapted for connection to the other AC power source conductor 46.

To supply power to the heating unit 12, the one terminal 52 of the AC power-supplying means 50 is connected through a switch 54 and a fuse 56 to one terminal 20 of the heating element 14. To complete the circuit, the other terminal 22 of the heating element 14 is connected to the other terminal 53 of the AC power-supplying means 50.

Lastly, for safety purposes, there is provided means for connecting the conductive outer sheath 16 to ground reference potential. Specifically, the outer sheath 16 is connected by means of a grounding conductor 60 to a ground terminal 62 of the terminal strip, and thereby through the ground conductor 48 and the grounding point 40 to the ground connection 38. The actual connection to the sheath 16 may be accomplished by any suitable means, such as a direct wire connection or connection through a mounting bracket to the frame of an appliance, where the appliance frame itself is grounded.

In the prior art circuit of FIG. 1, the primary protective device is the fuse 56. A fuse is typically selected which can carry the rated load current of the heating element 14 indefinitely, and which open-circuits within at least five seconds when at least twice the rated load current attempts to flow. Considering, for example, a fault or arcing short between the heating element 14 and the sheath 16 near the "hot" end 24 of the heating unit 12, the load resistance in the circuit decreases substantially, resulting in a substantial increase in current to rapidly "blow" the fuse 56. It will be appreciated that since the "N" power source conductor 46 and the ground conductor 48 are connected together within the service entrance 32, a complete circuit through the fuse 56 is completed regardless of whether the return is through the "N" conductor 46 or the ground conductor 48.

If, on the other hand, a fault were to occur between the heating element 14 and the sheath 16 near the "cold" end 26 of the heating unit 12, then a substantial portion of the resistance of the heating element 14 would remain in the circuit, limiting current through the fuse 56 to a value below that which quickly "blows" the fuse 56. Thus, the prior art circuit 10 of FIG. 1 would not provide immediate protection.

Considering the specific example of a fault occurring at the center of the heating unit 16, it will be apparent that the total load resistance presented by the heating element 14 is halved because the right half is bypassed by the fault. Thus, by Ohm's law, assuming line voltage remains constant, the current through the fuse 56 is doubled. This is sufficient current to blow the fuse 56 and the arc is interrupted. However, if conservative design principles are followed, there is no guarantee that a fault occurring further to the right (towards the "cold" end 26 of the heating unit 12) would result in sufficient current to "blow" the fuse 56 within five seconds. As a practical matter, the midpoint of the heating unit 12 is not the cutoff point at which protection absolutely ceases, but nonetheless there is a point towards the cold end 26 of the heating unit 12 beyond which sufficient current-limiting resistance remains in the circuit even under fault conditions so that the fuse 56 does not "blow" until "zippering" has occurred along a sufficient length of the heating unit 12 to bring the fault sufficiently near the center of the heating unit 12.

From the foregoing it will be apparent that a simple fuse 56 in series with the "hot" or "L" conductor 44 as shown in FIG. 1 does not provide complete protection against faults in the sheathed resistance heating element 12. If a fuse were placed in series with the "N" power source conductor 46, the situation would not be improved because this conductor is at ground potential anyway. No additional current, and possibly less, would flow through such a fuse under fault conditions.

Figure 3:
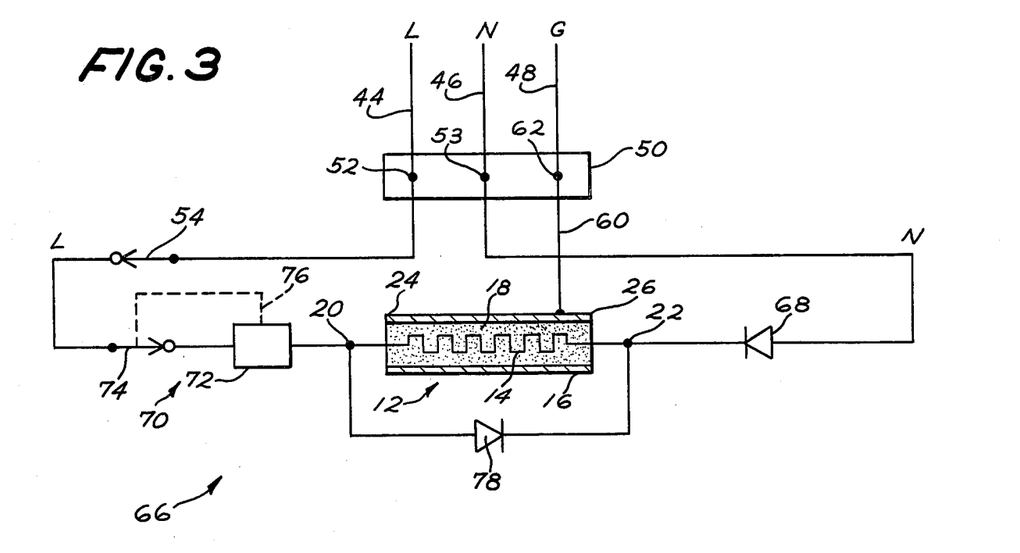
FIG. 3 is a schematic circuit diagram of a first embodiment of the invention wherein the heating unit is connected to a 120 volt unbalanced AC power line and operated with half-wave rectified power for partial power operation.

Referring now to FIG. 3, there is shown a circuit 66 of a first embodiment of the present invention. In FIG. 3, the AC power-supplying means 50 comprising a terminal strip remains unchanged from FIG. 1. The circuit 66 operates the heating unit 12 at partial power using the well known half-wave rectification method. Heating current is permitted to flow through the heating element 14 only during AC half-cycles of one polarity. To accomplish this, a unidirectional current conducting device 68, shown as a semiconductor rectifier diode, is connected in series with the heating element 14.

To effectively connect the terminals 20 and 22 of the heating element 14 across the terminals 52 and 53 of the AC power-supplying means 50 during AC half-cycles of at least the one polarity to cause heating current to flow through the heating element 14, one heating unit terminal 20 is connected through a means, generally designated 70, which is sensitive to current flow from the one terminal 52 of the AC power-supplying means 50 for interrupting current flow when sensed current exceeds a predetermined value. Under normal conditions, the overcurrent-sensitive circuit interrupting means 70 provides direct connection of the one heating element terminal 20 through the switch 54 to the one terminal 52 of the AC power-supplying means 50. To complete the circuit, the rectifier diode 68 is connected between the other terminal 22 of the heating element 14 and the other or "N" terminal 53 of the AC power-supplying means 50.

The polarization of the rectifier diode 68 determines the relative polarity of the AC half-cycles of one polarity during which heating current flows through the heating element 14. With the polarization of the rectifier diode 68 as illustrated in FIG. 3, the rectifier diode 68 is forward biased so as to permit conduction during negative AC half-cycles. Negative AC half-cycles are defined herein as that portion of a complete AC cycle when the "L" power source conductor 44 is negative with reference to the "N" power source conductor 46.

The overcurrent sensitive circuit interrupting means 70 may be any means which is sensitive to the current flow from the one terminal 52 of the AC power-supplying means 50 and which is effective to interrupt the current flow when sensed current exceeds a predetermined value. The overcurrent-sensitive current interrupting means 70 as shown in generalized form in FIG. 3 comprises a current-sensitive element 72 connected to a circuit interrupting element 74, the connection represented by a dash line 76. Many different forms of overcurrent-sensitive circuit interrupting means 70 may be employed in the practice of the present invention. For example, the current-sensitive element 72 may comprise either a small series resistance or an inductive pickup.

The circuit interrupting element 74, while shown as a switch or relay contact directly in series with the current-sensitive element 72, may be located anywhere in the circuit where it can effectively interrupt current flow from the AC power-supplying means 50. The overcurrent-sensitive circuit interrupting means 70 may range in complexity from a microprocessor-controlled device to a simple series fuse or circuit breaker. For basic, low-cost protection, a simple fuse is preferred.

The overcurrent-sensitive circuit interrupting means 70 is adjusted or sized to carry the rated load current of the heating element 14 under expected operating conditions, and to interrupt the current flow from the AC power source when the current exceeds a predetermined value in excess of the expected rated load current. The predetermined value is selected to be sufficiently high to avoid unnecessary "nuisance" interruptions of the circuit as a result of momentary current surges which occasionally occur during normal operation of the circuit, but yet sufficiently low to provide reliable protection. A value of twice the rated load current of the heating element 14 under the expected mode of operation is quite suitable. This value is consistent with the conventional practice in rating fuses. A fuse having a particular current rating, for example one amp, will carry that current indefinitely. Slight increases in current eventially cause the fuse to "blow," but normally not immediately. For increased currents, the fuse "blows" more quickly. Conventional fuse specifications specify that at twice rated current flow the fuse is guaranteed to interrupt the circuit within five seconds.

It will be appreciated that if an overcurrent-sensitive circuit interrupting means 70 based on electronics is employed, the response can be tailored as desired. For example, a predetermined value of only 10 percent in excess of the normal load current might be employed, with a suitable time delay to prevent "nuisance" interruption.

The portion of the circuit 66 of FIG. 3 thus far described provides for normal partial power operation of the heating unit 12 and for protection against faults between the heating element 14 and the outer sheath 16 near the "hot" end 24 of the heating unit 12. In accordance with the present invention, there is further provided a means for effectively connecting the other terminal 22 of the heating element 14 to the one terminal 52 of the AC power-supplying means 50 during AC half-cycles of the other polarity.

In FIG. 3, this means 50 comprises a unidirectional current conducting device shown as a failure current diode 78 connected from the other terminal 22 of the heating element 14 to the one terminal 52 of the AC power-supplying means 50. The diode 78 is polarized to conduct during AC half-cycles of the other polarity, that is during positive AC half-cycles. Thus it will be apparent that the circuit of FIG. 3 provides a means for alternately connecting each of the two terminals 20 and 22 of the heating element 14 to the one terminal 52 of the AC power-supplying means 50 during alternate AC half-cycles. In the particular circuit of FIG. 3, the connection of the one terminal 20 of the heating element 14 to the one terminal 52 of the AC power-supplying means 50 is polarity-insensitive and thus continues at all times. The other terminal 22 of the heating element 14 is connected through the failure current diode 78 to the one terminal 52 of the AC power-supplying means 50 only during AC half-cycles of the other polarity.

In the operation of the circuit of FIG. 3, a fault between the heating element 14 and the outer sheath 16 occurring anywhere along the length of the heating element 12 results in sufficient current through the overcurrent-sensitive circuit interrupting means 70 to cause circuit interruption and termination of the fault. If such a fault occurs anywhere from the approximate midpoint of the heating unit 12 to the left or "hot" end 26 of the heating unit 12, then current increases largely for the same reasons discussed above with reference to the prior art circuit of FIG. 1. The failure current diode 78 contributes additional current flow through the overcurrent-sensitive circuit interrupting means 70, but this unnecessary because there is sufficient current in any event to open the circuit.

However, if a fault occurs near the cold end 26 of the heating unit 12, then the benefit of the present invention is realized to cause sufficient current through the overcurrent-sensitive circuit interrupting means 70 to rapidly interrupt the flow of current. Under fault conditions, fault current flows through the failure current diode 78 during AC half-cycles of the other polarity, providing a sufficient contribution to the total RMS current through the overcurrent-sensitive circuit interrupting means 70 to open the circuit. For example, if a fault were to occur right at the cold end 26, then the failure current diode would effectively completely short circuit the terminals 52 and 53 of the AC power-supplying means 50 through the overcurrent-sensitive circuit interrupting means 70 during AC half-cycles of the other polarity, resulting in a relatively high current to immediately cause interruption of the circuit. In the case of a fault occurring in a region intermediate the midpoint of the heating unit 12 and the "cold" end 26, the combined current contributions of the normal direct connection of the one terminal 20 through the overcurrent-sensitive circuit interrupting means 70 to the one terminal 52 and of the connection of the other terminal 22 through the failure current diode and through the overcurrent-sensitive circuit interrupting means 70 produce an effective RMS current flow over a complete AC cycle through the overcurrent-sensitive circuit interrupting means 70 which is at least twice the RMS current value of the normal rated load current.

To quantify the benefit obtainable by the present invention, the Table below compares a typical prior are half-wave operating circuit to the circuit of FIG. 3 with respect to the RMS current drawn from the "L" or "hot" power source conductor 44 for various locations of a fault along the length of the heating unit 12. Such a typical prior art circuit may be visualized by omitting the failure current diode 78 in FIG. 3. The values in the Table are computed and are approximate. For ease of computation, the voltage drop through the fault is assumed to be zero. However, the benefit obtained has been experimentally verified. The particular heating element 14 for which the Table applies is designed to operate at a power of 375 watts under half-wave operating conditions, drawing a rated load current of 4.4 amps RMS. The fuse used in the circuit has a rating of 8 amps, which means that to reliably "blow" the fuse within five seconds at least 16 amps RMS must flow.

TABLE

| Fault Location (% length from "hot" end 24 | Fuse Current in Prior Art Half-wave Circuit | Fuse Current in Circuit of FIG. 3 |
| --- | --- | --- |
| 10% | 63 amps | 66 amps |
| 20% | 31 amps | 35 amps |
| 30% | 21 amps | 26 amps |
| 40% |  | 21 amps |
| 50% | 13 amps | 20 amps |
| 60% |  | 20 amps |
| 70% | 9 amps | 22 amps |
| 80% |  | 28 amps |
| 90% | 7 amps | 49 amps |

From this Table it can be seen that for the prior art half-wave rectified circuit, fault locations of approximately 50% or greater (from heating unit midpoint towards the cold end 26) do not guarantee circuit interruption. However, in the circuit of FIG. 3 employing the present invention, regardless of the location of the fault, sufficient overcurrent always occurs to rapidly and reliably blow an 8 amp fuse. The "worst case" occurs at approximately the 55% location, but even here the 20 amps RMS is more than sufficient.

Figure 4:
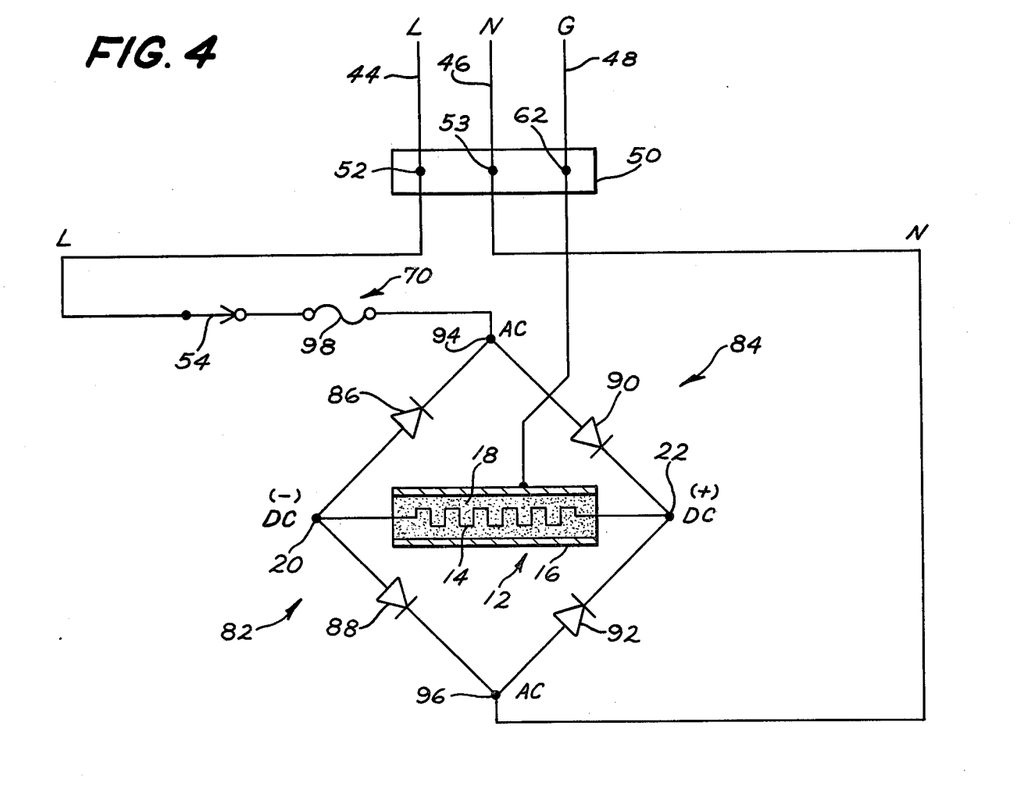
FIG. 4 is a schematic circuit diagram of a second embodiment of the invention wherein the sheathed electrical resistance heating unit is connected to a 120 volt unbalanced AC power line and operated with full-wave rectified power for full power operation.

In those cases where it is desired to operate the heating unit 12 from full-wave current for full power operation, the circuit 82 of FIG. 4 may be employed. In FIG. 4, the heating element terminals 20 and 22 are connected across the DC output terminals of a four-leg, full-wave bridge rectifier 84. The bridge rectifier 84 has four diodes 86, 88, 90 and 92 arranged in conventional configuration. The AC input terminals are designated 94 and 96. In FIG. 4, the overcurrent-sensitive circuit interrupting means 70 comprises a simple fuse 98 connected in series between the one terminal 52 and the AC input terminal 94.

In FIG. 4, the diodes 86 and 92 provide a means for connecting the heating unit terminals 20 and 22 across the terminals 52 and 53 of the AC power-supplying means 50 during AC half-cycles of the one polarity to cause heating current to flow through the heating element 14. Diodes 88 and 90 similarly provide a means for connecting the heating unit terminals 20 and 22 across the terminals 52 and 53 during AC half-cycles of the other polarity. In this arrangement diode 90 effectively connects the other heating element terminal 22 through the fuse 98 to the one terminal 52 during AC half-cycles of the other polarity.

In the operation of the circuit 82 of FIG. 4, the heating element 14 is supplied with power during both AC half-cycles for fullwave, full power operation. Additionally, each of the heating unit terminals 20 and 22 is effectively connected through the fuse 98 to the one terminal 52 during alternate AC half-cycles. With the polarization of diodes 86 and 92 as illustrated in FIG. 4, diodes 86 and 92 are forward biased so as to permit conduction during negative AC half-cycles. During negative AC half-cycles, excessive current in fuse 98 will result from ground faults in that portion of heating element 14 nearest terminal 20. The total current through interrupting means 70 in such instances comprises the normal current flowing from line N to line L via diode 92, heater resistance 14 and diode 86, and fault current flowing from line G to line L via the ground fault, some fraction of resistance 14, and diode 86, the fraction of resistance 14 in the ground fault path depending upon the location of the fault.

For faults in the portion of heating element 14 nearest terminal 22, sufficient current limiting resistance remains in the circuit so that fuse 98 does not blow as a result of excessive current during negative half-cycles. For such fault conditions, excessive current flows from line L to line G during positive AC half-cycles for which the "hot" or line L potential is applied via diode 90 to terminal 22, in a manner analogous to that described with respect to diode 78 of FIG. 3. As a result, a fault occurring at either end or anywhere along the heating unit 12 results in at least twice normal RMS current flow through the fuse 98 for reliable circuit interruption and termination of "zippering."

Figure 5:
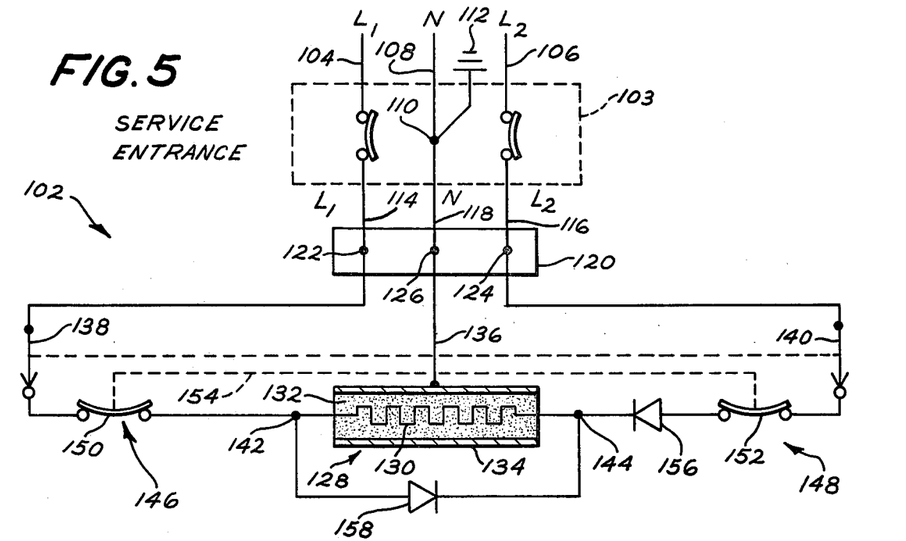
FIG. 5 is a schematic circuit diagram of another embodiment of the invention wherein a sheathed electrical resistance heating unit is connected to a 240 volt balanced AC power line and operated with half-wave rectified power.

Referring now to FIG. 5, a circuit 102 illustrates an application of the present invention when half-wave, partial power operation of a sheathed electrical resistance heating unit from a 240 volt balanced AC supply system is desired. While in most cases where partial power operation of a 240 volt heating unit is desired the heating unit is simply connected between either of the "hot" sides of the line and neutral for 120 volt operation, the circuit 102 of FIG. 5 is included to illustrate the wide range of applicability of the present invention.

Specifically, in FIG. 5, a service entrance 103 is connected to "L$_1$" and "L$_2$" power lines 104 and 106 which have a potential of 240 volts relative to each other. Each has a potential of 120 volts relative to a neutral or "N" line 108. Within the service entrance 103 the "N" line 108 is connected to a grounding point 110, which is also connected to an external ground connection 112.

The output of the service entrance 103 comprises "L$_1$" and "L$_2$" conductors 114 and 116. Each of the conductors 114 and 116 supplies a voltage relative to the ground reference potential. Additionally, there is a neutral or "N" conductor 118.

A means 120 within the appliance itself for supplying AC power to the circuitry of the appliance comprises a terminal strip, or alternatively a standard plug (not shown). The AC power-supplying means 120 has two terminals 122 and 124 connected to the "L₁" and "L₂" conductors 114 and 116, respectively. Additionally, a terminal 126 is connected to the "N" conductor 118 and thereby to ground potential. A sheathed electrical resistance heating unit 128 is similar to the previously described heating unit 12, except that it is designed for operation from a 240 volt power source. As before, the heating unit 128 comprises a resistance heating element 130 surrounded by a layer of ceramic insulation material 132 and encased in an outer sheath 134. For safety purposes, the outer sheath 134 is connected by means of a conductor 136 to the "N" terminal 126 and thereby to ground reference potential.

In FIG. 5, a double-pole switch has a pair of contacts 138 and 140 interposed between the terminals 122 and 124 and heating unit terminals 142 and 144, respectively.

Means 146 and 148 sensitive to current flow from the terminals 122 and 124 for interrupting current flow when sensed current exceeds a predetermined value are interposed in series with each of the terminals 122 and 124. In FIG. 5, the overcurrent-sensitive current interrupting means 146 and 148 are shown as circuit breakers 150 and 152 which are interconnected. The interconnection, shown in dash lines 154, is such that if either of the circuit breakers 150 or 152 senses an overcurrent condition, then both of the circuit breakers 150 and 152 open-circuit. While such an interconnection is not a standard circuit breaker feature, and not a known off-the-shelf item, such may readily be constructed by those skilled in the art. In the event the overcurrent-sensitive circuit interrupting means 146 and 148 are electronic devices employing current sensors and separate circuit interrupters as generally shown in FIG. 3, the interconnection 154 would be particularly easy to implement.

To provide for normal half-wave operation, a rectifier diode 156 is interposed between the heating element terminal 144 and the power-supplying terminal 124. The rectifier diode 156 is polarized to conduct during AC half-cycles of one polarity, in this case during half-cycles when "L₁" is negative with respect to "L₂." As in FIG. 3, a failure current diode 158 is connected between the heating element terminal 144 and the power-supplying terminal 122, and polarized to conduct during AC half-cycles of the other polarity when "L₁" is positive with respect to "L₂."

Before considering the operation of the circuit 102 of FIG. 5, the operation under fault conditions of a prior art circuit (not specifically shown) designed for operation from a 240 volt balanced power line and employing half-wave rectification will be described for purposes of comparison. Such a circuit may be visualized by simply omitting the failure current diode 158 from FIG. 5. First it will be assumed that a fault occurs near the center of the heating unit 128. For AC half-cycles of one polarity when "L₁" is negative with respect to "L₂," the rectifier diode 156 conducts. The heating element 170 behaves as a simple resistive voltage divider and no potential difference exists between the outer sheath 134 and the heating element 130 at the location of the fault. Therefore, during AC half-cycles of the one polarity, normal current flows through both circuit breakers 150 and 152 despite the presence of a fault condition. During AC half-cycles of the other polarity, the rectifier diode 156 is reversed biased. Since the center of the heating element 130 is effectively grounded through the fault, 120 volts from "L₁" is applied across the left-hand side of the heating element 130. As a result, a fault current equal to the normal current flows through the "L₁" circuit breaker 150. Thus, over a complete AC cycle, approximately 1.4 times normal RMS current flows through the circuit breaker 150. The circuit would likely be interrupted and the arcing terminated.

Second, it will be assumed a fault occurs slightly to the right of the center of the heating unit 128. Now, during AC half-cycles of the one polarity when the rectifier diode 156 is conducting, slightly more current flows through the "L₂" circuit breaker 152, but not twice normal current. During AC half-cycles of the other polarity, the fault current through the "L₁" circuit breaker 150 is less than a value equal to the normal current since additional resistance is effectively inserted in the series circuit having 120 volts applied. Over a complete AC cycle, the RMS current through the circuit breaker 150 is less than 1.4 times normal current. As a result, there is no assurance that either circuit breaker will be tripped.

Now considering the operation of the present invention, when the failure current diode 158 is included in FIG. 5, then protection is afforded for all possible fault locations. At least one of the circuit breakers 150 and 152 trips, and due to the interconnection 154, the other opens as well.

Considering specifically a fault occurring near the center of the heating unit 128, during AC half-cycles of the one polarity the rectifier diode 156 conducts and normal current flows through both circuit breakers 150 and 152. However, during AC half-cycles of the other polarity, the failure current diode 158 conducts. In this instance, not only does the left-hand portion of the heating element 130 comprise a load on the "L₁" power line, but the right-hand side does as well due to current through the failure current diode 158. Therefore, during positive AC half-cycles, twice normal current flows through the circuit breaker 150. Over an entire AC cycle, approximately twice normal RMS current flows through the circuit breaker 150, producing more reliable tripping of the circuit breaker 150 than would be the case without the failure current diode 158.

Moreover, if the fault occurs farther to the right of the midpoint of the heating unit 128, protection continues. There is no point at which current through the circuit breaker 150 is less than twice normal current, as in the case without the failure current diode 158. With proper circuit breaker selection, circuit interruption occurs for any fault location.

Figure 6:
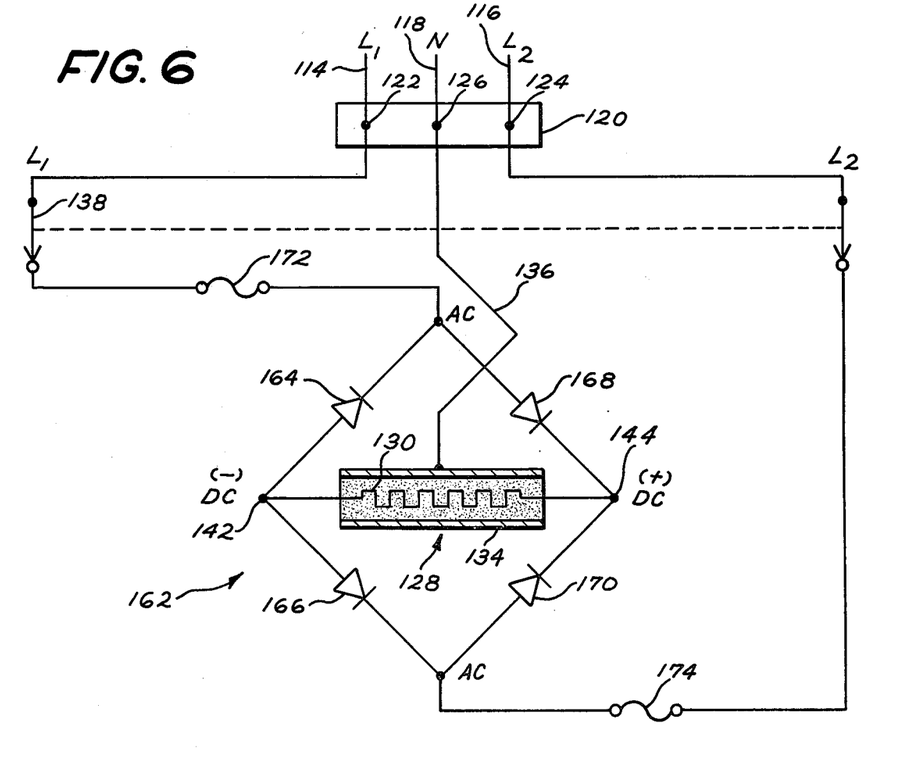
FIG. 6 is a schematic circuit diagram of still another embodiment of the invention wherein the heating unit is connected to a 240 volt balanced AC power line and operated with full-wave rectified power.

Referring now to FIG. 6, the circuit 162 is an embodiment of the invention connected to a 240 volt balanced AC supply line where full-wave, full power operation of the heating unit 128 is desired. As in the circuit 82 of FIG. 4, the terminals 142 and 144 of the heating unit 128 are connected across the DC outputs conductors of a four-leg, full-wave bridge rectifier comprising diodes 164, 166, 168 and 170 connected in the usual arrangement.

In the particular circuit 162 of FIG. 6, the full advantages of the present invention are not obtained in that immediate protection against faults at any point along the heating unit 128 is not afforded. Specifically, a fault near the center of the heating unit 128 does not immediately produce an overcurrent in either "L₁" or "L₂." Thus, FIG. 6 does not represent a preferred embodiment.

However, if a fault occurs near either end of the heating unit 128, then the circuit 162 of FIG. 6 has the advantage that an overcurrent flows in both "L₁" and "L₂." As a result, simple fuses 172 and 174 may be included in each of the lines "L₁" and "L₂," with no interconnection between the fuses 172 and 174 required. If a heating unit were simply connected across a 240 volt balanced AC power line with a fuse in each leg, a fault near one end of the heating unit would result in overcurrent through one fuse only, and the fault would simply travel along the heating unit towards the other fuse until such time as sufficient current flows to "blow" that fuse as well.

Thus, with the arrangement of FIG. 6, a degree of protection may be afforded without the interconnection of circuit breakers as in FIG. 5, thus permitting the use of lower cost fuses 172 and 174.

Figure 7:
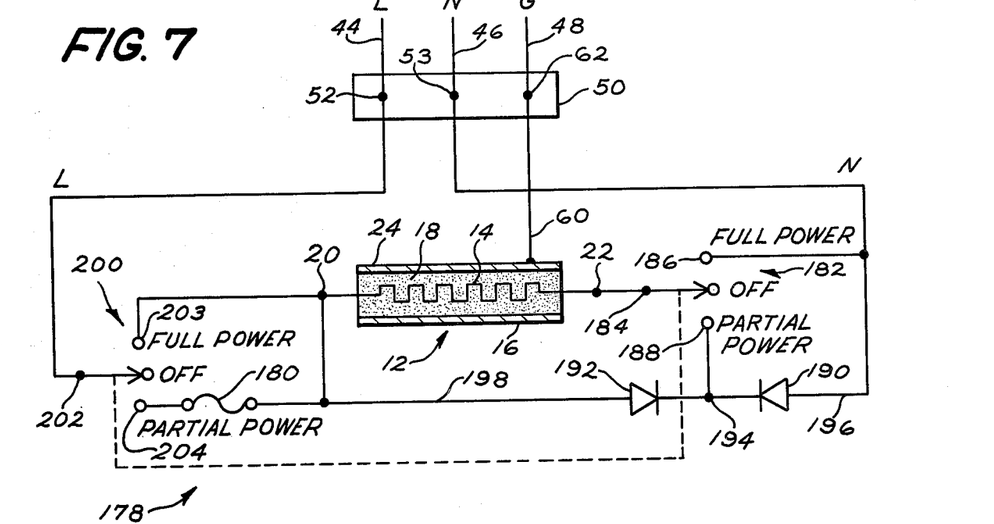
FIG. 7 is a schematic circuit diagram of a dishwasher switching circuit connectable to a 120 volt unbalanced AC power line wherein the heating unit may be operated either normally from ordinary full-wave AC power, or from half-wave rectified power with the protection provided by the present invention.

Referring now to FIG. 7, there is shown a heating unit operating and protective circuit 178 for operating the 120 volt heating unit 12 in an automatic dishwasher. The circuit 178 of FIG. 7 operates the heating unit 12 from a 120 volt unbalanced AC power line, and includes a switching arrangement to operate the heating unit 12 either from full-wave AC power for full power operation, or from half-wave rectified power for partial power operation. During full power operation, the protection of the present invention is not provided, but such protection is provided during the partial power operation. For reasons pointed out next below, this is not a serious limitation.

Specifically, the heating unit 12 is positioned adjacent to but spaced from the bottom 30 of a wash tub, as illustrated in FIG. 2. Full power operation of the heating unit 12 occurs during a washing operation when the dishwashing tub is filled with water. Thus heat produced by a fault in the heating unit 12 is in large measure dissipated in the water which surrounds the heating unit 12, and the likelihood of serious damage resulting is minimized. Partial power operation of the heating unit 12 occurs during a drying portion of the dishwashing cycle when the tub does not contain water. Under these conditions, the consequences of a heating unit fault are of potentially greater consequence. The heating unit operating and protective circuit 178 of FIG. 7 provides the protection of the present invention during partial power operation during the dishwasher drying cycle.

Referring specifically to FIG. 7, the circuit 178 includes an overcurrent-sensitive circuit interrupting means 180 connected in series between the one terminal 52 and the one terminal 20 of the heating unit 12 for interrupting current flow when sensed current exceeds a predetermined value. In FIG. 7, this means 180 comprises quite simply a fuse.

A first switching means 182 comprises a single-pole, three-throw switch having a movable contact terminal 184 and first and second fixed contact terminals 186 and 188. Preferably, the first switching means 182 is a conventional cam-operated switch included as a part of the cycle control timer (not shown) of the dishwasher. The other terminal 22 of the heating element 14 is connected to the movable contact terminal 184 of the first switching means 182. The first fixed contact terminal 186 is connected directly to the other terminal 53 of the AC power-supplying means 50.

To provide protected partial power operation, a rectifier diode 190 and a failure current diode 192 are connected in series and oppositely poled with respect to each other. Their junction 194 is connected to the second movable contact terminal 188. To complete the circuit, the free terminal 196 of the rectifier diode 190 is connected to the other terminal 53 of the power source connection means 50, and the free terminal 198 of the failure current diode 192 is connected to the one terminal 20 of the heating element 14.

In order to provide optimal sizing for the fuse 180 for best protection during the half-wave, partial power operating mode, the fuse 180 is sized to carry the RMS current (averaged over a complete AC half-cycle) for partial power operation. Such a fuse value possibly would not hold the current required for full-wave, full power operation. Accordingly, a second switching means 200 is provided and is ganged to operate with the first switching means 182. The second switching means 200 disables the current-sensitive means 180 when the first switching means 182 connects the movable contact terminal 184 to the first fixed contact terminal 186 for full power operation. Specifically, in the full power switch position, switch terminals 202 and 203 bypass the fuse 180, leaving it completely out of the circuit. In the partial power switch position, switch terminals 202 and 204 complete the series connection of the fuse 180 between the heating unit terminal 20 and the AC power-supplying terminal 52.

For full power operation, when the first switching means 182 is thrown to the upper position in the illustration, a complete and uninterrupted full-wave circuit is completed from the terminal 52, through the second switching means 200, through the heating element 14, through the first switching means 182 and back to the terminal 53.

For partial power operation, the switching means 182 and 200 are thrown to the lower position. The resultant circuit configuration is substantially identical to the protection circuit 56 described with reference to FIG. 3.

Figure 8:
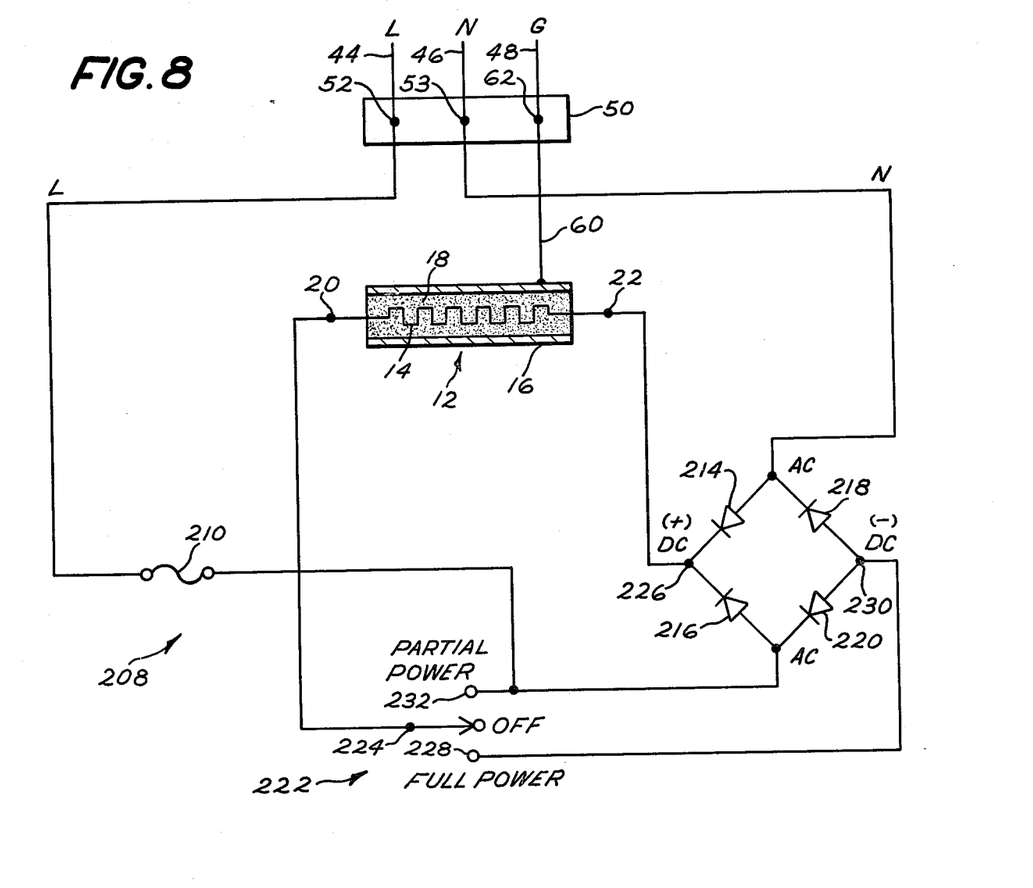
FIG. 8 is a specific circuit embodying the present invention wherein a sheathed electrical resistance heating unit may be operated either from half-wave rectified power for partial power operation, or from full-wave rectified power for full power operation, with the protection of the present invention obtained with either power operation. The particular switching arrangement of FIG. 8 is not the subject matter of the present invention, but rather is the sole invention of Leroy J. Herbst, one of the inventors named herein.

Referring lastly to FIG. 8, there is illustrated a heating unit operating and protective circuit 208 for an automatic dishwasher, which circuit 208 provides either half-wave partial power operation or full-wave, full power operation of the heating unit 12 with complete protection afforded according to the present invention for both modes of operation. The particular switching arrangement of the circuit 208 of FIG. 8 is not the subject matter of the present invention, but rather is the sole invention of LeRoy J. Herbst.

The circuit 208 includes an overcurrent protective device in the form of a fuse 210 in series with the "L" power line. A four-leg full-wave rectifier bridge arrangement 212 comprises diodes 214, 216, 218 and 220. As pointed out below, the bridge rectifier 212 is not operated as a bridge rectifier under all conditions. Specifically, it is not operated as a bridge rectifier during the partial power operating mode.

The switching arrangement of FIG. 8 comprises a single-pole three-throw switch 222, which comprises a set of contacts on a dishwasher operating timer. As shown, the common switch terminal 224 is connected to the one terminal 20 of the heating element 14. The other terminal 22 of the heating element 14 is connected to the rectifier bridge positive DC output terminal 226. The AC input terminals of the rectifier bridge 212 are connected across the "L" and "N" power line conductors at all times. However, due to the polarization of the diodes, no current can flow in the circuit until the load in the form of the heating element 14 is effectively connected in some manner to the rectifier bridge 212.

To provide for full power operation, the lower terminal 228 of the switch 222 is connected to the negative DC output terminal 230 of the bridge rectifier 212. Thus when the switch 222 is in lower position, the heating element 14 is effectively connected to the bridge rectifier 212 in a manner substantially identical to that diagrammed and explained with reference to FIG. 4. Protection according to the invention is provided under all locations of a fault along the heating unit 12, as explained with reference to FIG. 4.

For partial power operation, the upper switch contact 232 is connected through the fuse 210 to the "L" power line. When the switch is in the upper or partial power position, a half-wave operating and protection circuit, substantially identical to the configuration of FIG. 3, is produced, and protection according to the present invention afforded. In this configuration, the diode 214 serves as the rectifier diode, the diode 216 serves as the failure current diode, and the diodes 218 and 220 do not conduct under any conditions and are therefore effectively out of the circuit.

The rating for the fuse 210 of FIG. 8 must be carefully selected, as this fuse is called upon to provide protection under both the full-wave and half-wave operating conditions. For one particular heating unit 12 designed for operation from 120 volts, the nominal current (RMS) for half-wave wave partial power operation is 4.4 amps for a power output of 375 watts. The nominal current for full-wave, full power operation is 6.25 amps, for a power of 750 watts. It will thus be seen that a fuse size of approximately 8 amps may be selected and will be suitable for holding the expected normal current under both conditions, but yet will be rapidly and effectively "blown" as a result of a fault during either operating condition. If separate fuses are desired, additional switch contacts may be provided to switch in alternate fuses for full power and partial power operation.

It will thus be apparent that the present invention provides reliable failure protection for sheathed electrical resistance heating units. Protection is afforded regardless of the location of the fault along the heating unit for circuits intended to operate a heating unit from a 120 volt unbalanced AC supply system, under either full power or partial power conditions; or from a 240 volt balanced system where the heating unit is operated for partial power operation. In the situation where the heating unit is operated under full power conditions from a balanced 240 volt supply, full advantages of the present invention are not obtained but there is a partial advantage. The preferred embodiments of the invention provide reliable and low-cost protection for the heating units.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A protective circuit comprising:
  a sheathed electrical resistance heating unit including a heating element having two terminals for connection to a source of AC power, and including a conductive outer sheath;
  means for connecting said conductive outer sheath to a ground reference potential;
  means for supplying AC power, said AC power-supplying means having two terminals, one of said terminals of said AC power-supplying means supplying a voltage relative to the ground reference potential;
  means sensitive to current flow from said one terminal of said AC power-supplying means for interrupting current flow from said AC power-supplying means when sensed current exceeds a predetermined value; and
  means for connecting said terminals of said heating element to said terminals of said AC power-supplying means, including means for continuously connecting one of said heating element terminals to said one terminal of said AC power-supplying means and means for effectively connecting the other of said heating element terminals to said one terminal of said AC power-supplying means during alternate half-cycles of the supplied AC power;
  the predetermined current value being higher than the normal load current of said heating element and lower than the current during fault conditions;
  whereby, in the event a fault occurs between said heating element and said conductive outer sheath near either end of said heating unit, sufficient additional current is drawn from said one terminal of said AC power-supplying means to cause said current-sensitive means to interrupt the current flow.

2. The protective circuit of claim 1, wherein said means for connecting said other of said heating element terminals to said one terminal of said AC power-supplying means during alternate half-cycles of the supplied AC power comprises:
  a unidirectional current conducting device connecting the other terminal of said heating element to said one terminal of said AC power-supplying means and polarized to conduct during AC half-cycles of the other polarity;
  whereby, in the event a fault occurs between said heating element and said conductive outer sheath anywhere along said heating unit, sufficient current is drawn from said one terminal of said AC power-supplying means to cause said current-sensitive means to interrupt the current flow.

3. The protective circuit of claim 2, wherein the other terminal of said AC power-supplying means is connected to ground reference potential.

4. The protective circuit of claim 1, wherein said means for connecting said terminals of said heating element to said terminals of said AC power-supplying means comprises:
  a pair of unidirectional current conducting devices, one of said unidirectional current conducting devices connected between said one terminal of said AC power-supplying means and one terminal of said heating element and polarized to conduct during AC half-cycles of one polarity, and
  the other of said unidirectional current conducting devices connected between said one terminal of said AC power-supplying means and the other terminal of said heating element and polarized to conduct during AC half-cycles of the other polarity.

5. The protective circuit of claim 4, wherein the other terminal of said AC power-supplying means is connected to ground reference potential;
  whereby, in the event a fault occurs between said heating element and said conductive outer sheath anywhere along said heating unit, sufficient current is drawn from said one terminal of said AC power-supplying means to cause said current-sensitive means to interrupt the current flow.

6. A protective circuit comprising:
a sheathed electrical resistance heating unit including a heating element having two terminals for connection to a source of AC power, a layer of insulating material surrounding said heating elements, and a conductive outer sheath;
means for connecting said conductive outer sheath to a ground reference potential;
means for supplying AC power, said AC power-supplying means having two terminals, one of said terminals of said AC power-supplying means supplying a voltage relative to the ground reference potential;
means sensitive to current flow from said one terminal of said AC power-supplying means for interrupting current flow from said AC power-supplying means when sensed current exceeds a predetermined value;
means for connecting said heating unit terminals across said terminals of said AC power-supplying means during AC half-cycles of at least one polarity to cause heating current to flow through said heating element, one terminal of said heating element being effectively connected to said one terminal of said AC power-supplying means during the AC half-cycles of the one polarity; and
means for effectively connecting the other terminal of said heating element to said one terminal of said AC power-supplying means during AC half-cycles of the other polarity;
the predetermined current value being higher than the normal load current of said heating element and lower than the current during fault conditions;
whereby, in the event a fault occurs between said heating element and said conductive outer sheath near either end of said heating unit, sufficient additional current is drawn from said one terminal of said AC power-supplying means to cause said current-sensitive means to interrupt the current flow.

7. The protective circuit of claim 6, wherein:
said means sensitive to current flow for interrupting current flow comprises an overcurrent-sensitive circuit-interrupting means connected in series with said one terminal of said AC power-supplying means, said circuit-interrupting means capable of carrying the normal load current of said heating element and sized to open circuit when current through said circuit-interrupting means exceeds approximately at least twice the normal load current of said heating element;
said one terminal of said heating element is connected through said overcurrent-sensitive circuit interrupting means to said one terminal of said AC power-supplying means during AC half-cycles of one polarity; and
said other terminal of said heating element is connected through said overcurrent-sensitive circuit interrupting means to said one terminal of said AC power-supplying means during AC half-cycles of the other polarity.

8. The protective circuit of claim 6, wherein said means for effectively connecting said other terminal of said heating element to said one terminal of said AC power-supplying means during AC half-cycles of the other polarity comprises a unidirectional current conducting device connected between said other terminal of said heating element and said one terminal of said AC power-supplying means and polarized to conduct during AC half-cycles of the other polarity.

9. The protective circuit of claim 6, wherein said unidirectional current conducting device is a semiconductor diode.

10. The protective circuit of claim 6, wherein the other terminal of said AC power-supplying means is connected to ground reference potential;
whereby, in the event a fault occurs between said heating element and said conductive outer sheath anywhere along said heating unit, sufficient current is drawn from said one terminal of said AC power-supplying means to cause said current-sensitive means to interrupt the current flow.

11. The protective circuit of claim 6, wherein said means for connecting said heating unit terminals across said terminals of said AC power-supplying means during AC half-cycles of a least one polarity to cause heating current to flow through said heating element comprises:
polarity-insensitive means connecting said one terminal of said heating element to said one terminal of said AC power-supplying means; and
a unidirectional current conducting device connected between said other terminal of said heating element and the other terminal of said AC power-supplying means and polarized to conduct during AC half-cycles of the one polarity.

12. The protective circuit of claim 11, wherein said means for effectively connecting the other terminal of said heating element to said one terminal of said AC power-supplying means during AC half-cycles of the other polarity comprises a unidirectional current conducting device connected between said other terminal of said heating element and said one terminal of said AC power-supplying means and polarized to conduct during AC half-cycles of the other polarity;
whereby, in the event a fault occurs between said heating element and said conductive outer sheath anywhere along said heating unit, sufficient current is drawn from said one terminal of said AC power-supplying means to cause said current-sensitive means to interrupt the current flow.

13. The protective circuit of claim 12, wherein the other terminal of said AC power-supplying means is connected to ground reference potential.

14. The protective circuit of claim 6, wherein said means for connecting said heating unit terminals across said terminals of said AC power-supplying means during AC half-cycles of at least one polarity to cause heating current to flow through said heating element comprises:
a unidirectional current conducting device connecting said one terminal of said heating element to said one terminal of said AC power-supplying means; and
another unidirectional current conducting device connecting said other terminal of said heating element to the other terminal of said AC power-supplying means;
both unidirectional current conducting devices polarized to conduct during AC half-cycles of the one polarity.

15. The protective circuit of claim 14, wherein said means for effectively connecting the other terminal of said heating element to said one terminal of said AC power-supplying means during AC half-cycles of the other polarity comprises a unidirectional current conducting device connecting said other terminal of said heating element to said one terminal of said AC power-supplying means and polarized to conduct during AC half-cycles of the other polarity.

16. The protective circuit of claim 15, wherein the other teminal of said power source connection means is connected to ground reference potential;
whereby, in the event a fault occurs between said heating element and said conductive outer sheath anywhere along said heating unit, sufficient current is drawn from said one terminal of said AC power-supplying means to cause said current-sensitive means to interrupt the current flow.

17. A protective circuit comprising:
a sheathed electrical resistance heating unit including a heating element having two terminals for connection to a source of AC power, a layer of insulating material surrounding said heating element, and a conductive outer sheath;
means for connecting said conductive outer sheath to a ground reference potential;
means for supplying AC power, said AC power-supplying means having two terminals, one of said terminals of said AC power-supplying means supplying a voltage relative to the ground reference potential;
overcurrent-sensitive circuit interrupting means connected in series between said one terminal of said AC power-supplying means and one terminal of said heating unit, said circuit interrupting means capable of carrying the normal load current of said heating element and sized to open circuit when current through said circuit interrupting means exceeds approximately at least twice the normal load current of said heating element;
a rectifier diode connected in series between the other terminal of said heating element and the other terminal of said AC power-supplying means, said rectifier diode polarized to conduct during AC half-cycles of one polarity; and
a failure current diode connected in parallel with said heating element between said one terminal of said AC power-supplying means and said other terminal of said heating element, said failure current diode oppositely polarized with respect to said rectifier diode;
whereby heating current flows through said circuit interrupting means, through said heating element, and through said rectifier diode during AC half-cycles of the one polarity to effect partial power operation of said heating element, and, in the event a fault occurs between said heating element and said sheatah, fault current flows through said circuit-interrupting means and through said failure current diode during AC half-cycles of the other polarity, resulting in sufficient total current through said circuit-interrupting means to cause said circuit interrupting means to open circuit regardless of the location of the fault along said heating unit.

18. The protective circuit of claim 17, wherein the other terminal of said AC power-supplying means is connected to ground reference potential.

19. A protective circuit comprising:
a sheathed electrical resistance heating unit including a heating element having two terminals for connection to a source of AC power, a layer of insulating material surrounding said heating element, and a conductive outer sheath;
means for connecting said conductive outer sheath to a ground reference potential;
means for supplying AC power, said AC power-supplying means having two terminals, one of said terminals of said AC power-supplying means supplying a voltage relative to the ground reference potential, and the other of said terminals of said AC power-supplying means connected to ground reference potential;
overcurrent-sensitive circuit interrupting means having one terminal connected to said one terminal of said AC power-supplying means, said circuit interrupting means capable of carrying the normal load current of said heating element and sized to open circuit when current exceeds approximately at least twice the normal load current of said heating element;
a four-leg bridge rectifier having a pair of AC input terminals and a pair of DC output terminals;
said heating element terminals being connected across said bridge rectifier output terminals;
one of said bridge rectifier AC input terminals being connected to the other terminal of said overcurrent-sensitive circuit interrupting means; and
the other of said bridge rectifier AC input terminals being connected to the other terminal of said AC power-supplying means;
whereby, full wave rectified current flows through said heating element to effect normal heating operation of said element, and, in the event a fault occurs between said heating element and said sheath, sufficient additional fault current flows through said circuit interrupting means to cause said circuit interrupting means to open circuit regardless of the location of the fault along said heating unit.

20. An automatic dishwasher comprising:
a sheathed electrical resistance heating unit including a heating element having two terminals for connection to a source of AC power, a layer of insulating material surrounding said heating element, and a conductive outer sheath, a heating unit operating and protective circuit comprising:
means for connecting the conductive outer sheath to a ground reference potential;
means for supplying AC power, said AC power-supplying means having two terminals, one of said terminals of said AC power-supplying means supplying a voltage relative to ground reference potential, and the other of said terminals of said AC power-supplying means connected to ground reference potential;
means sensitive to current flow from said one terminal of said AC power-supplying means for interrupting current flow from said AC power-supplying means when sensed current exceeds a predetermined value;
a first switching means having a movable contact terminal and first and second fixed contact terminals;
the other terminal of said heating element being connected to said movable contact terminal of said first switching means;
said first fixed contact terminal of said first switching means being connected to the other terminal of said AC power-supplying means, whereby said heating element is connected across said terminals of said AC power-supplying means when said first switching means connects said movable contact terminal and said first fixed contact terminal;

a rectifier diode and a failure current diode connected in series and oppositely poled with respect to each other;

the junction of said diodes being connected to said second fixed contact terminal of said first switching means;

the free terminal of said rectifier diode being connected to the other terminal of said AC power-supplying means; and the free terminal of said failure current diode being connected to said one terminal of said heating element.

21. The dishwasher of claim 20, further comprising:

a second switching means, ganged to operate with said first switching means, said second switching means connected to disable said current-sensitive means when said first switching means connects said movable contact terminal and said first fixed contact terminal.

22. The dishwasher of claim 20, wherein:

said first switching means is a set of contacts operated by a cycle control timer.

23. A method for terminating a fault between the heating element and the grounded conductive outer sheath of a sheathed electrical resistance heating unit supplied from an unbalanced-to-ground source of AC power having one terminal which supplies a voltage relative to ground reference potential and another terminal which is grounded, regardless of where along the heating unit the fault occurs, which method comprises:

continuously connecting one terminal of the heating element to the one terminal of the AC power source;

alternately connecting the other terminal of the heating element to the one terminal of the AC power source during alternate AC half-cycles;

sensing the current supplied by the one terminal of the AC power source;

disconnecting the AC power source from the heating element when the sensed current exceeds a predetermined value.

* * * * *